Dec. 22, 1964  R. A. MULFORD  3,162,719
X-FRAME TRANSMISSION LINE STRUCTURE
Filed July 30, 1962  3 Sheets-Sheet 1

INVENTOR
RICHARD A. MULFORD
BY
ATTORNEYS

Dec. 22, 1964 R. A. MULFORD 3,162,719
X-FRAME TRANSMISSION LINE STRUCTURE
Filed July 30, 1962 3 Sheets-Sheet 2
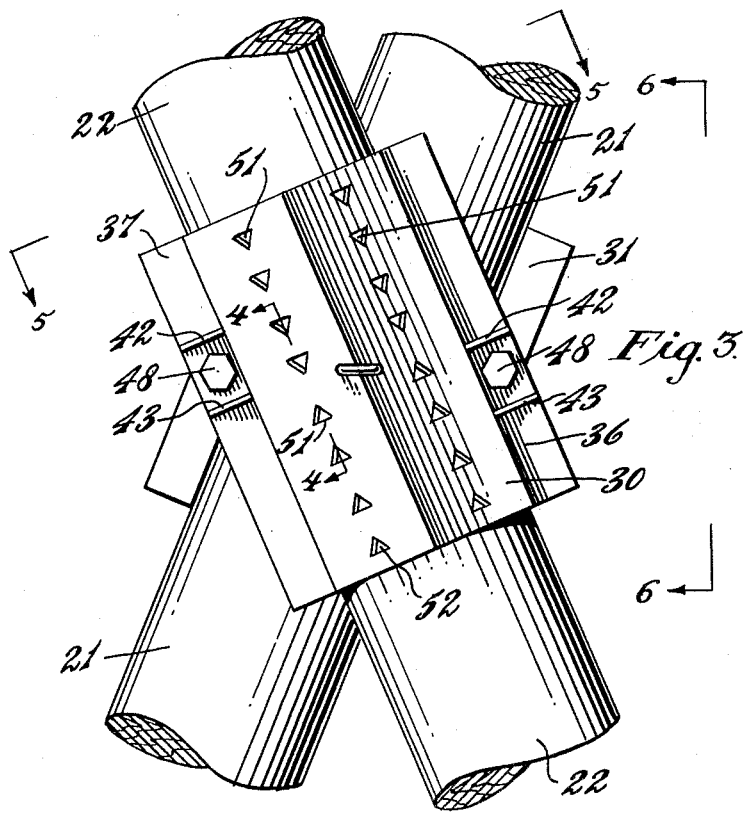
Fig. 3.
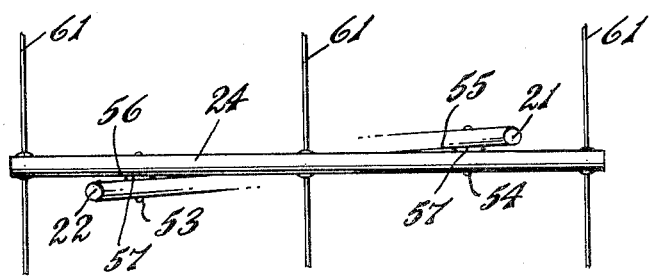
Fig. 2.
INVENTOR
RICHARD A. MULFORD
BY
ATTORNEYS Dec. 22, 1964   R. A. MULFORD   3,162,719
X-FRAME TRANSMISSION LINE STRUCTURE
Filed July 30, 1962   3 Sheets-Sheet 3
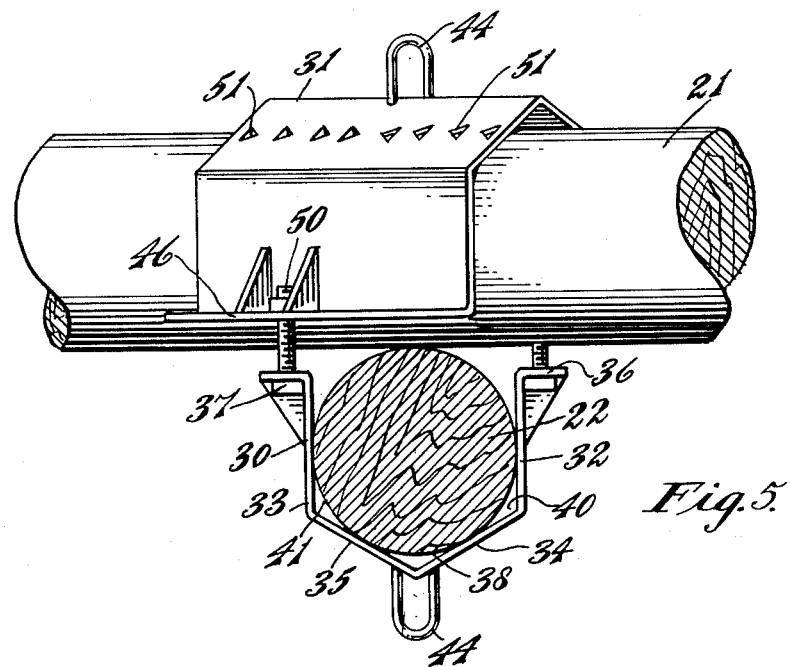
Fig. 5.
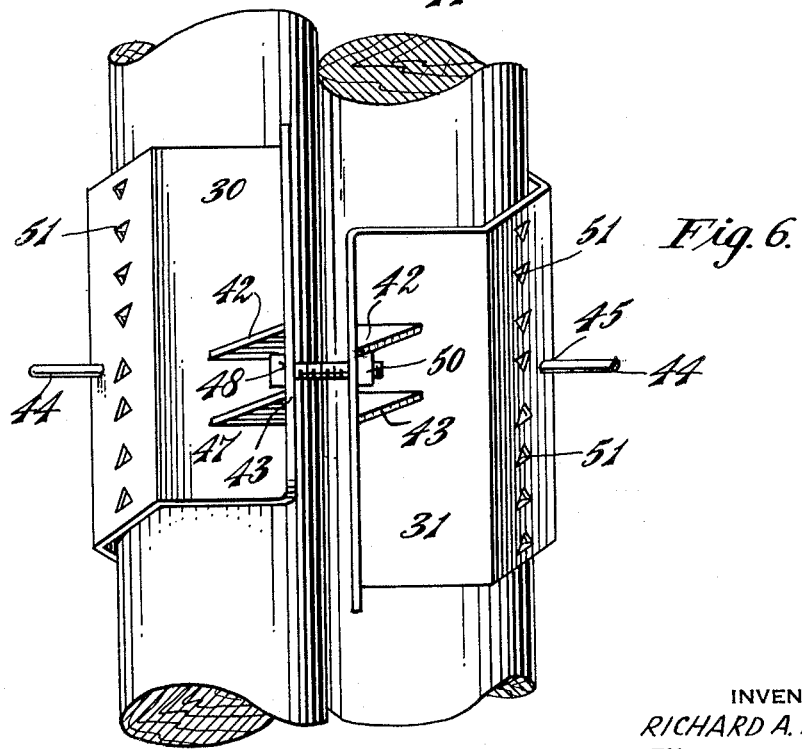
Fig. 6.
INVENTOR
RICHARD A. MULFORD
BY
ATTORNEYS

3,162,719
X-FRAME TRANSMISSION LINE STRUCTURE
Richard A. Mulford, 1231 Wisteria Drive, Malvern, Pa.
Filed July 30, 1962, Ser. No. 213,848
5 Claims. (Cl. 174—45)

This invention pertains to power transmission line towers and more particularly to towers constructed of poles.

A purpose of the invention is to provide a more simple and stronger tower assembly.

A further purpose is to make installation of the transmission tower easier.

A further purpose is to eliminate the cross-braces or V braces in a tower assembly.

A further purpose is to reduce the time necessary for installing a power line transmission tower.

A further purpose is to improve the effectiveness of a power transmission tower construction.

A further purpose is to reduce the overall cost of a power line transmission installation.

A further purpose is to use the tower to inherently form a truss construction and not to depend on the strength of supplementary cross-bracing.

A further purpose is to eliminate holes through the poles at the crossing of the X to avoid weakening the tower.

A further purpose is to allow for substantial flexibility and slight changing of angle of cross of the X under lateral load.

A further purpose is to allow for stress redistribution at the crossing of the X to provide greater strength.

A further purpose is to provide spade interlocks or tiger teeth to prevent longitudinal sliding of the poles at the clamp.

A further purpose is to eliminate the need for an earth anchor and/or guy wires to a transmission line tower in poor soil condition.

A further purpose is to achieve the restraining effect of the soil to eliminate uprooting of the tower under lateral loads.

A further purpose is to use the tops of the poles extending above the crossarm as ground wire supports.

A further purpose is to use fewer components in a power line transmission tower.

A further purpose is to provide a pole structure in which there is a reduced length of pole necessary to be inserted in the ground.

A further purpose is to provide a clamp for lashing the crossed poles wherein the clamp elements are longitudinally disposed to one another in an angular relationship.

A further purpose is to provide a clamp for holding the poles in an angular relationship without perforating the poles.

Still another purpose is to provide a pole lashing clamp of simple design having adequate strength and flexibility which has a non-sliding grip on the poles and is detachably mounted with two bolts.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 2 is a partial plan view taken on the line 2—2 of FIGURE 1.

FIGURE 3 is an enlarged fragmentary elevational view of the lashing clamp shown in FIGURE 1.

FIGURE 5 is a section taken along line 5—5 of FIGURE 2.

FIGURE 6 is a section taken on the line 6—6 of FIGURE 3.

Figures 1, 4:
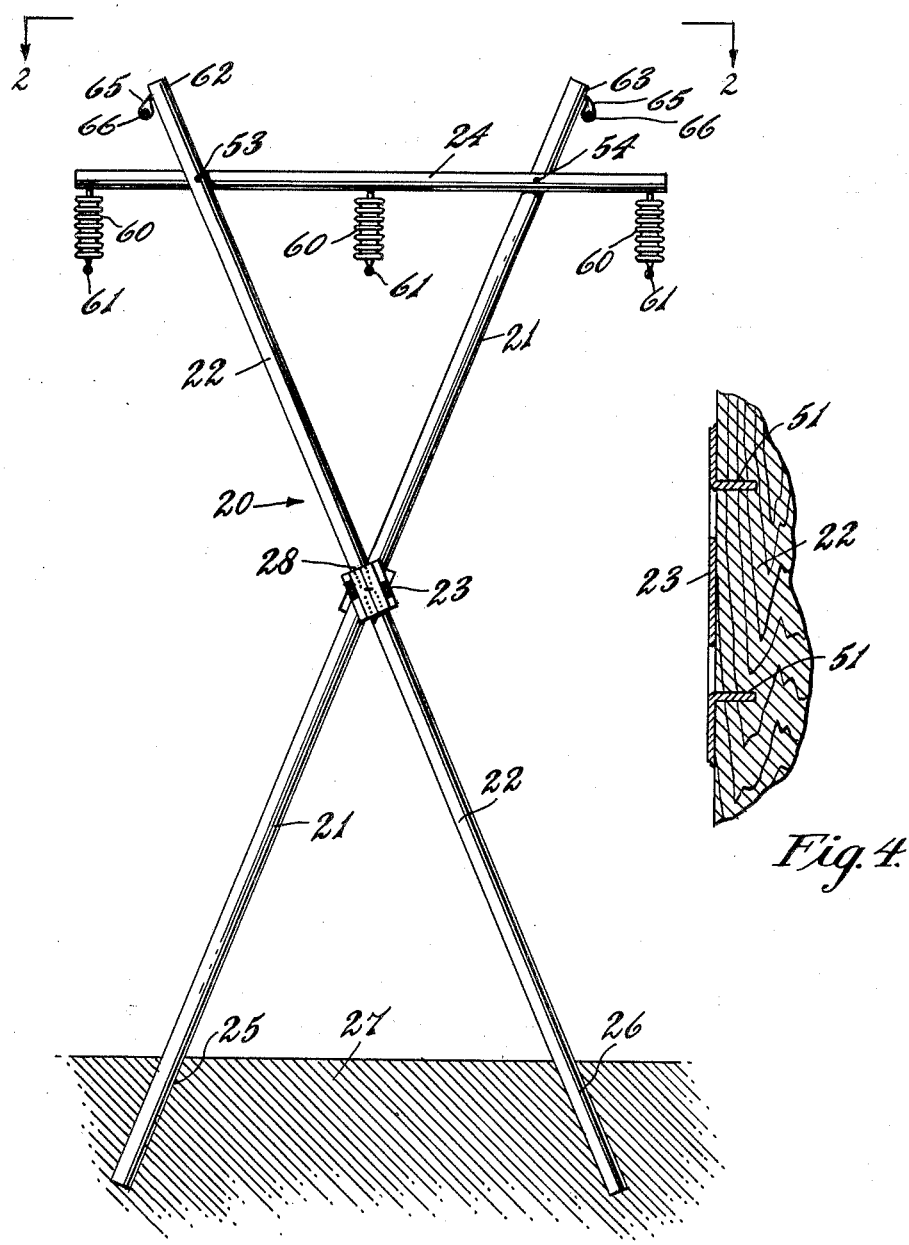
FIGURE 1 is an elevational view of the tower of the invention.
FIGURE 4 is a fragmentary enlarged sectional view taken on the line 4—4 of FIGURE 3.

In the prior art practice as followed by major electric power utilities, the power transmission lines of high voltage are usually carried on wooden pole line assemblies which are called wooden towers. A common form of these towers has two poles spaced about 15 feet apart, erected vertically, with crossarms near the top. This structure is essentially an H-frame. A separate truss arrangement such as cross-bracing between the poles had to be fabricated and joined to the poles to give the tower the necessary rigidity. Furthermore, it was usually necessary to use diagonal bracing on the crossarm or crossarms of the poles.

The above prior art construction is considerably involved and requires up to 6 hours to install by a typical power company crew. Furthermore, the completed tower had to be supplemented with additional structure. When there was a lateral load in the plane of the poles against the tower, one pole was in compression and one in tension. This resulted in a substantial upward vertical force being applied to the tension pole and this in effect was an extracting force which would tend to unearth a pole not having a heavy earth burden. To correct this, it was usual to apply an earth anchor in poor soil conditions.

In the present invention, an X-frame tower construction is utilized in which a lashing clamp which does not require drilling of the poles is applied around both of the poles. The lashing clamp allows for substantial flexibility, and by slight change under lateral load of angle of crossing, allows stress redistribution which contributes to greater strength. To prevent longitudinal sliding of the poles in the clamp, it has spade interlocks or tiger teeth to engage the pole surfaces. It is fabricated of plate gage with gussets welded in to brace the attachment flanges. The bolt holes are offset to allow for the angular positioning.

Should the poles be fastened together at their intersection by a bolt through both poles, a point of weakness and of high stress concentration is created tending to split the poles as well as to break them by means of bending stress. Calculations show that such through-bolt construction would provide a tower which would be impractically weak for use in electric power transmission. My lashing clamp, which produces only surface indentations on the poles, eliminates the weakness caused by the holes, has no tendency to split the poles, and minimizes bending stress concentration on the poles to the extent that my X-frame tower is substantially stronger than the H-frame tower of equivalent pole size presently in use.

The tower 20 of the invention comprises poles 21 and 22, a lashing clamp 23, and a crossarm 24. The poles 21 and 22 are set in foundation holes 25 and 26 in soil 27 and are inclined at any suitable angle to the vertical, but may be, for instance, approximately 22½ degrees. The clamp 23 is applied at the crossing point 28 of the poles and consists of two halves 30 and 31. Each half partially surrounds a respective pole and consists of a longitudinal sheath having flanges and having opposed parallel faces 32 and 33 which extend in planes normal to the plane lying between the poles 21 and 22. Longitudinal faces 34 and 35 intersecting each other and faces 32 and 33 respectively form a V-base for the clamp half. Flanges 36 and 37 outwardly extend from parallel faces 32 and 33 respectively in a direction parallel to the plane between the poles. The angle 38 formed by the inclined faces 34 and 35 may be of the order of 120 degrees, and the angles 40 and 41 made by these inclined faces with the respective adjacent parallel faces may also be of the order of 120 degrees.

The flanges 36 and 37 each have a hole or opening adapted to receive a bolt. Suitable gussets 42 and 43 are welded or otherwise connected to the faces 32 and 33 and the flanges 36 and 37 to stiffen the flanges in the vicinity of the bolt connection. A pole step and lifting eye 44 is connected to the clamp at 45 so that the clamp can be lifted by a sling or cable means. Also, this step 44 provides convenient means for assisting a lineman to climb the pole. The holes 46 receive bolts 48 and nuts 50.

The clamp 23 has teeth 51 which have been struck up from the inclined faces 34 and 35. These teeth are triangular in form and extend perpendicular to the respective inclined face surfaces and are driven into the pole to provide a firm connection to the pole.

The clamp halves 30 and 31 are designed to effectively engage poles of a variety of diameters to minimize the number of sizes of clamps necessary to have available. The separation of the opposed parallel faces 32 and 33 is such as to receive the largest diameter pole to be used with the respective clamp size. To assure positive pressure contact between the crossed poles, the parallel faces 32 and 33 are narrow enough to prevent abutment of the flanges 36 and 37 for the smallest diameter pole to be used with the clamp. Intermediate of the clamp halves, the two bolts 48 have exposed lengths which are free to deflect under load and thus provide the substantial degree of flexibility without unduly stressing the poles, which is a feature of this invention. It will be evident that the clamp has capacity for permitting limited relative movement of the poles with respect to each other.

As seen in FIGURE 2, the crossarm 24 extends across the poles and is attached to them by bolts 53 and 54, the engaging surfaces of the respective poles and crossarm being provided with grid gains 57 to reduce stress concentration at the bolt holes. It will be seen that the side 55 of the crossarm is against the pole 21 while the opposite side 56 of the crossarm is against pole 22. By virtue of this arrangement, it would be necessary to shear at least one of the bolts 53 or 54 in order for the crossarm 24 to rotate about its longitudinal axis in either a clockwise or counterclockwise direction. Thus, there is a very effective restraint against any rotation of the crossarm.

Insulators 60 are suspended from the crossarm in spaced relationship and these carry the transmission conductors 61. Suitable ground wire supports 64 and 65 are attached at 62 and 63 respectively for supporting ground wires 66 at the topmost point on the poles and ground leads (not shown) travel down the poles 21 and 22 to point 28. The leads may be continued down each pole to a soil connection, or the leads may be joined at the crossing and continued down one of the poles as a single lead.

The top ends of the poles are inclined upwardly outward from their point of attachment to the crossarm 24, and the tops are therefore more nearly vertically over the outer conductors than would be the case for the prior art H-frame tower. It will be evident that this can best be understood by considering the projections in a horizontal plane through the conductor-to-conductor connection. The distance of the conductor-to-conductor connection to the projection of the adjacent ground wire connection is substantially less than the distance from the conductor-to-insulator connection to the intersection of the adjacent pole with said plane. To provide the conventional shielding angle, suitably 30 degrees to the vertical, my X-frame tower therefore need not extend as high above the crossarm as in the equivalent H-frame tower, and the overall height above ground of the X-frame tower would then not be as great.

In a typical tower construction on which full scale lateral and load tests were made, two A.S.A. Class 2 poles 60 feet long were used to form the X. A 30 foot long Class 2 pole was used for the crossarm. The lashing clamp was approximately two feet in length with 8 tiger teeth in each of the inclined faces 34 and 35 at 3 inch centers in each section of the clamp. The crossarm was held to each pole by a ⅞ inch diameter machine bolt with grid gains and washers. Each of the poles was set into the ground at an inclination of about 22½ degrees. The length of the pole set in the ground was approximately 7 feet. The crossarm was attached to the poles at a linear distance of about 4 feet 3 inches from the top of each pole. The lashing clamp was placed on the poles at a linear distance of approximately 25 feet 6 inches from ground. The distance of the poles apart at ground level was about 20 feet. The distance between the poles at the top at the point of connection of the crossarm was approximately 18 feet. A ground wire was attached to each pole at a point about 6 inches from the top.

The tests showed that under lateral loading the above X-frame tower failed at 19,000 pounds as compared with 14,500 pounds for the conventional, equivalent H-frame tower, indicating an increase in strength of over 30% for the X-frame tower. The H-frame tower failed by breaking of one pole and the cross-bracing, whereas the X-frame tower failed by shearing one bolt of the lashing clamp. There was no damage to the poles, crossarm or clamp halves of the X-frame tower, indicating the ease with which repairs could be made on a line of X-frame towers in case of catastrophic storm damage.

The above-described X-frame tower on which the tests were made was erected in less than three hours by a typical power utility 8-man crew working at normal speed. Erection of the equivalent H-frame tower by the same crew would require over twice this time, because of the many additional components to be installed. With modern hydraulically controlled augering equipment, boring of the battered excavations for the X-frame poles requires no more time than for the vertical H-frame excavations.

The preferred method of erecting my X-frame tower is as follows:

(1) Foundation holes at predetermined spacing are augered to predetermined depth and batter.
(2) Each pole is set separately and the earth is backfilled and tamped, leaving the poles overly inclined.
(3) The poles are pulled together to predetermined position by slings applied above the point of intersection.
(4) The two halves of the clamp are applied to the poles and drawn together by the bolts, at the same time applying auxiliary impact to the inclined surfaces of the clamp for more effective engagement of the teeth in the pole surface.
(5) The crossarm receiving holes are drilled in the poles perpendicularly to the plane extending between the two poles.
(6) The crossarm, previously drilled and provided with appropriate hardware, is hoisted into position and attached to the poles.
(7) The ground wire support brackets are installed adjacent to the tops of the poles.

The elevation above ground of the point of intersection of the poles with respect to the height of the crossarm is an important factor in establishing the strength of the tower, the strength increasing with increasing relative height of the intersection. As the elevation of the intersection above ground is lowered from about half the crossarm height above ground, the tower becomes increasingly weaker and unstable to the point of becoming impractical. Accordingly, to achieve the above advantages over the H-frame tower, the intersection should not be lower than about half the crossarm height above ground. The upper limit of relative elevation of the intersection is determined by electrical clearance requirements of the conductors and ground line spacing between poles.

Although I have illustrated and described my X-frame tower as constructed of wood poles, it is to be understood that the invention is equally adapted to the use of metallic, concrete or plastic poles.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. A transmission line tower, comprising a pair of poles arranged in the form of an X, a lashing clamp holding the poles in an abutting relationship at the crossing of the X, and a horizontal crossarm connected to the poles adjacent to the top of the X, the respective poles engaging opposite sides of said crossarm, said lashing clamp having capacity for permitting limited relative translational movement of the poles at their abutment, and said lashing clamp comprising two sheathing elements held in an oblique angular relationship, each of said elements comprising a sheath portion partially surrounding one of said poles, and a flange portion receiving connections whereby the elements are fixed to one another.

2. A transmission line tower, comprising a pair of poles arranged in the form of an X, a lashing clamp holding the poles in an abutting relationship at the crossing of the X, and a horizontal crossarm connected to the poles adjacent to the top of the X, the respective poles engaging opposite sides of said crossarm, said lashing clamp having capacity for permitting limited relative translational movement of the poles at their abutment, said lashing clamp comprising two similar elements, each of said elements having a wrap which partially surrounds a respective pole leaving one side of the pole exposed, said elements being bolted together.

3. A transmission line tower, comprising a pair of poles arranged in the form of an X, a lashing clamp holding the poles in an abutting relationship at the crossing of the X, and a horizontal crossarm connected to the poles adjacent to the top of the X, the respective poles engaging opposite sides of said crossarm, said lashing clamp having capacity for permitting limited relative translational movement of the poles at their abutment, and said lashing clamp comprising two similar elements, each of said elements having a wrap which partially surrounds a respective pole leaving one side of the pole exposed, said elements being connected by a plurality of bolts, and said elements being spaced apart such that the bolts have substantial exposed length between said elements, said exposed lengths being free to deflect under lateral loading of said tower, the relative strengths of said bolts and said poles being such that under increasing lateral loading of said tower bolt failure will occur before either pole is broken.

4. In a tower for power transmission lines, a first and second pole, said poles being inclined to the vertical at substantially a 22½ degree angle, said poles crossing to form an X, a lashing clamp at the crossing of the X comprising a plurality of elements surrounding the poles, a crossarm adjacent the upper ends of the poles, wherein the crossarm at one end on a first side abuts against the said first pole, and the crossarm at the other end on a second side circumferentially opposite said first side abuts against the second pole, the said lashing clamp having a first and a second half, each half comprising in cross section two opposed parallel faces, two converging faces integrally connected to two opposed faces, whereby said faces form a generally U cross section, flanges extending transversely from said parallel faces, the flanges of the respective clamps being in opposed relation and the proportions of said poles and clamp halves being such that the opposed flanges of the respective clamps are spaced apart, and flexible connecting means for holding said flanges together in spaced relation.

5. A tower of claim 4, wherein the said connecting means consists of two bolts each extending through openings in respective opposed flanges and nuts connected to said bolts.

References Cited by the Examiner
UNITED STATES PATENTS

| | | | |
|---|---|---|---|
| 290,752 | 12/83 | Davis | 189—25 |
| 1,404,777 | 1/22 | Leutner | 189—36 X |
| 1,540,398 | 6/25 | Jackson | 287—49 |
| 1,667,558 | 4/28 | Malone | 189—33 |
| 1,744,353 | 1/30 | Austin | 174—45 X |
| 2,333,869 | 11/43 | Larkin | 287—49 |
| 2,844,643 | 7/58 | Cofer et al. | 174—45 X |

JOHN F. BURNS, *Primary Examiner.*

JOHN P. WILDMAN, LARAMIE E. ASKIN, *Examiners.*